US010262767B2

(12) United States Patent
Mundra et al.

(10) Patent No.: US 10,262,767 B2
(45) Date of Patent: Apr. 16, 2019

(54) PLASTICIZER FOR COLOR RETENTION DURING HEAT AGING

(75) Inventors: Manish K. Mundra, Willow Grove, PA (US); Robert F. Eaton, Belle Mead, NJ (US); Abhijit Ghosh-Dastidar, East Brunswick, NJ (US)

(73) Assignee: Dow Global Technologies LLC, Midland, MI (US)

( * ) Notice: Subject to any disclaimer, the term of this patent is extended or adjusted under 35 U.S.C. 154(b) by 941 days.

(21) Appl. No.: 14/347,069

(22) PCT Filed: Sep. 14, 2012

(86) PCT No.: PCT/US2012/055307
§ 371 (c)(1),
(2), (4) Date: Mar. 25, 2014

(87) PCT Pub. No.: WO2013/048771
PCT Pub. Date: Apr. 4, 2013

(65) Prior Publication Data
US 2014/0234622 A1    Aug. 21, 2014

Related U.S. Application Data

(60) Provisional application No. 61/541,323, filed on Sep. 30, 2011.

(51) Int. Cl.
| | | |
|---|---|---|
| C09D 7/63 | (2018.01) | |
| H01B 3/30 | (2006.01) | |
| H01B 3/44 | (2006.01) | |
| C08K 5/101 | (2006.01) | |
| C08K 5/103 | (2006.01) | |
| C08L 27/06 | (2006.01) | |
| C08K 5/1515 | (2006.01) | |
| C09D 127/06 | (2006.01) | |

(52) U.S. Cl.
CPC ............ *H01B 3/307* (2013.01); *C08K 5/101* (2013.01); *C08K 5/103* (2013.01); *C08K 5/1515* (2013.01); *C09D 7/63* (2018.01); *C09D 127/06* (2013.01); *H01B 3/443* (2013.01); *Y10T 428/2967* (2015.01)

(58) Field of Classification Search
CPC ..... C09D 7/1233; C08K 5/1515; H01B 3/307
See application file for complete search history.

(56) References Cited

U.S. PATENT DOCUMENTS

| | | | |
|---|---|---|---|
| 2,852,563 A | 9/1958 | Hagemeyer, Jr. et al. | |
| 3,070,608 A | 12/1962 | Kuester et al. | |
| 3,377,304 A * | 4/1968 | Kuester ................ | C08K 5/101 524/114 |
| 3,607,805 A | 9/1971 | Meyers et al. | |
| 4,137,381 A | 1/1979 | Kraus et al. | |
| 5,244,949 A | 9/1993 | Wirth et al. | |
| 5,283,273 A | 2/1994 | Sander et al. | |
| 5,324,846 A * | 6/1994 | Hirshman ............ | C08K 5/1515 554/121 |
| 5,880,310 A | 3/1999 | Ageishi et al. | |
| 6,013,703 A | 1/2000 | Kuhn et al. | |
| 6,797,753 B2 | 9/2004 | Benecke et al. | |
| 7,070,731 B2 | 7/2006 | Kato et al. | |
| 7,071,343 B2 * | 7/2006 | Daute ................... | C07D 303/42 549/514 |
| 8,703,849 B2 | 4/2014 | Hagberg et al. | |
| 2002/0013396 A1 | 1/2002 | Benecke et al. | |
| 2005/0167031 A1 | 8/2005 | Bahng et al. | |
| 2006/0180956 A1 | 8/2006 | Kato et al. | |
| 2009/0149585 A1 | 6/2009 | De Quadros, Jr. et al. | |
| 2010/0010127 A1 | 1/2010 | Barki et al. | |
| 2010/0292492 A1 * | 11/2010 | Geng ....................... | B01J 23/02 549/539 |
| 2010/0324185 A1 * | 12/2010 | Geng .................... | C07D 303/42 524/109 |
| 2011/0272174 A1 * | 11/2011 | Chaudhary ............. | C08L 27/06 174/110 SR |
| 2012/0181057 A1 * | 7/2012 | Chaudhary ............ | C08K 5/103 174/110 V |
| 2012/0277357 A1 * | 11/2012 | Hagberg ................. | C07C 67/03 524/114 |
| 2014/0234622 A1 | 8/2014 | Mundra et al. | |

FOREIGN PATENT DOCUMENTS

| | | | |
|---|---|---|---|
| EP | 0419801 A1 | 4/1991 | |
| EP | 0432096 A1 | 6/1991 | |
| WO | 9602465 A1 | 2/1996 | |
| WO | 01/98404 A2 | 12/2001 | |
| WO | 2007006489 A1 | 1/2007 | |
| WO | 2009/102877 A1 | 8/2009 | |
| WO | 2011/041363 A1 | 4/2011 | |
| WO | 2011/041396 A1 | 4/2011 | |
| WO | WO 2011090812 A2 * | 7/2011 | ............. C07C 67/03 |

OTHER PUBLICATIONS

Vikoflex Products (Year: 2009).*
Vikoflex Products. Epoxidized soybean and linseed fatty acid esters, Apr. 18, 2009, Arkema Inc.
Frank P. Greenspan et al., Industrial and Engineering Chemistry, vol. 45, No. 12, Dec. 1953, pp. 2722-2726.
Holser, Industrial Crops and Products, 27 (2008), 130-132.

* cited by examiner

*Primary Examiner* — Jennifer A Chriss
*Assistant Examiner* — Ricardo E. Lopez
(74) *Attorney, Agent, or Firm* — Husch Blackwell LLP

(57) ABSTRACT

The present disclosure is directed to a plasticizer, a polymeric composition containing the plasticizer, and conductors coated with the polymeric composition. The plasticizer includes a blend of an epoxidized soybean oil and a trans-esterified epoxidized fatty acid methyl ester. The trans-esterified epoxidized fatty acid methyl ester has an oxirane value greater than or equal to 6.8%. The plasticizer, the polymeric composition, and the coated conductor retain color during heat aging.

12 Claims, No Drawings

PLASTICIZER FOR COLOR RETENTION DURING HEAT AGING

CROSS REFERENCE TO RELATED APPLICATION

The present application is the national phase of PCT Patent Application No. PCT/US2012/055307 filed Sep. 14, 2012, which claims priority to U.S. Provisional Application No. 61/541,323, filed Sep. 30, 2011, the entire content of which is incorporated by reference herein.

FIELD

The present disclosure is directed to a plasticizer with color retention during heat aging.

BACKGROUND

Plasticizers are compounds or mixtures of compounds that are added to polymer resins to impart softness and flexibility. Phthalic acid diesters (also known as "phthalates") are known plasticizers in many flexible polymer products, such as polymer products formed from polyvinyl chloride (PVC) and other vinyl polymers. Examples of common phthalate plasticizers include di-isononyl phthalate (DINP), diallyl phthalate (DAP), di-2-ethylhexyl-phthalate (DEHP), dioctyl phthalate (DOP) and diisodecyl phthalate (DIDP). Other common plasticizers, used for high temperature applications, are trimellitates and adipic polyesters. Mixture of plasticizers are often used to obtain optimum properties.

Phthalate plasticizers have recently come under intense scrutiny by public interest groups that are concerned about the negative environmental impact of phthalates and potential adverse health effects in humans (especially children) exposed to phthalates.

A known phthalate-free plasticizer for use in polyvinyl chloride (PVC) formulations is epoxidized soy oil. A growing number of applications require phthalate-free plasticizer to retain color when subjected to heat. However, epoxidized soy oil discolors when subjected to heat.

Accordingly, a need exists for a plasticizer having little, or no, phthalate with reduced, or no, discoloration when subjected to heat.

SUMMARY

The present disclosure is directed to a plasticizer, a polymeric composition containing the plasticizer, and conductors coated with the polymeric composition. The plasticizer and the polymeric composition retain color during heat aging.

In an embodiment, a plasticizer is provided and includes a blend of an epoxidized soybean oil and a trans-esterified epoxidized fatty acid methyl ester. The trans-esterified epoxidized fatty acid methyl ester has an oxirane value greater than or equal to 6.8%. The plasticizer has an APHA value from 250 to 650 when heat aged at 190° C. for 100 minutes.

In an embodiment, a polymeric composition is provided and includes a vinyl chloride resin and a plasticizer. The plasticizer is the blend of epoxidized soybean oil and trans-esterified epoxidized fatty acid methyl ester described above. The polymeric composition has a Yellowness Index less than 165 when heat aged at 190° C. for 100 minutes.

In an embodiment, a coated conductor is provided and includes a conductor and a coating on the conductor. The coating is formed from the polymeric composition composed of the vinyl chloride resin and the plasticizer. The plasticizer is the blend of epoxidized soybean oil and trans-esterified epoxidized fatty acid methyl ester described above. The coating has a Yellowness Index less than 165 when heat aged at 190° C. for 100 minutes.

An advantage of the present disclosure is a phthalate-free plasticizer with color retention when subjected to heat.

An advantage of the present disclosure is a phthalate-free plasticized polymeric composition with color retention when subjected to heat.

DETAILED DESCRIPTION

1. Plasticizer

The present disclosure provides a plasticizer. In an embodiment, a plasticizer is provided and includes a blend of an epoxidized soybean oil and a trans-esterified epoxidized fatty acid methyl ester (TeFAME). The TeFAME has an oxirane value greater than or equal to 6.8%. The blend has an APHA value from 250 to 650 when heat aged at 190° C. for 100 minutes.

A "plasticizer" is a substance that lowers the modulus and tensile strength, and increases flexibility, elongation, impact strength, and tear strength of the polymeric resin (typically a thermoplastic polymer) to which it is added. A plasticizer may also lower the melting point of the polymeric resin, which lowers the glass transition temperature and enhances processability of the polymeric resin to which it is added. In an embodiment, the present plasticizer is a phthalate-free plasticizer, or is otherwise void of phthalate.

The plasticizer is a blend of epoxidized soybean oil and TeFAME. The term "epoxidized soybean oil" (or "eSO"), as used herein, is a soybean oil having at least one fatty acid moiety that contains at least one epoxide group. An "epoxide group" is a three-member cyclic ether (also called oxirane or an alkylene oxide) in which an oxygen atom is joined to each of two carbon atoms that are already bonded to each other. Epoxidation may occur by way of reaction of the natural oil with percarboxylic acid and/or other peroxy compounds.

A "transesterified epoxidized fatty acid methyl ester" (or "TeFAME"), as used herein, is an epoxidized fatty acid methyl ester prepared by transesterifying eSO. An "epoxidized fatty acid methyl ester" (or "eFAME") is a $C_4$-$C_{24}$ (saturated or unsaturated) carboxylic acid methyl ester with at least one epoxide group. Esterification is a process in which two reactants, typically an acid (such as a fatty acid) and an alcohol, are reacted with one another to form an ester. Transesterification is the process of exchanging the organic group R" of an ester with the organic group R' of an alcohol. The TeFAME is produced by transesterifying eSO with methanol and a catalyst, such as an acid or base catalyst.

In an embodiment, the TeFAME has an oxirane value from greater than 6.8% to 13.6%, or 10.1%, or 7.4%.

The eSO and the TeFAME are blended to form a plasticizer. The plasticizer has an APHA value from 20, or 40 to 80, or 60 prior to heat aging.

In an embodiment, the plasticizer is formed by blending from 35 weight percent (wt %) to 65 wt % of the eSO with 65 wt % to 35 wt % of the TeFAME. Weight percent is based on total weight of the plasticizer.

In a further embodiment, the plasticizer is formed by blending from 25 wt % to 75 wt % eSO with from 75 wt % to 25 wt % TeFAME.

In an embodiment, the process includes adding an antioxidant to the plasticizer. Nonlimiting examples of antioxidant include Irganox® 1076 (Octadecyl-3-(3,5-di-tert.butyl-4-hydroxyphenyl)-propionate), Baeropan 9754KA (mixed metal soap of calcium and zinc fatty acid salts), and Lowinox® TBP-6 (2,2'-Thiobis(6-t-butyl-4-methylphenol)).

The present plasticizer may comprise two or more embodiments disclosed herein.

2. Polymeric Composition

The present disclosure provides a polymeric composition that, in one embodiment, includes a vinyl chloride resin and the plasticizer as disclosed above. The polymeric composition has a Yellowness Index less than 165 when heat aged at 190° C. for 100 minutes. In a further embodiment, the polymeric composition has a Yellowness Index from 130 to less than 165 when heat aged at 190° C. for 100 minutes.

The term "vinyl chloride resin," as used herein, is a vinyl chloride polymer, such as polyvinyl chloride (PVC), or a vinyl chloride copolymer such as vinyl chloride/vinyl acetate copolymer, vinyl chloride/vinylidene chloride copolymer, vinyl chloride/ethylene copolymer or a copolymer prepared by grafting vinyl chloride onto ethylene/vinyl acetate copolymer. The vinyl chloride resin can also include a polymer blend of the above-mentioned vinyl chloride polymer or vinyl chloride copolymer with other miscible or compatible polymers including, but not limited to, chlorinated polyethylene, thermoplastic polyurethane, olefin polymers such as a methacryl polymer or acrylonitrile-butadiene-styrene polymer (ABS).

In an embodiment, the vinyl chloride resin is polyvinyl chloride (PVC). PVC is known to be thermoplastic as opposed to thermoset.

In an embodiment, the polymeric composition includes from 65 wt % to 85 wt % vinyl chloride resin, and from 35 wt % to 15 wt % of the plasticizer. In a further embodiment, the polymeric composition includes 75 wt % vinyl chloride resin and 25 wt % of the plasticizer. Weight percent is based on total weight of the polymeric composition with the total being 100%.

In an embodiment, the polymeric composition includes 75 wt % vinyl chloride resin, 12.5 wt % eSO and 12.5 wt % TeFAME. Weight percent is based on total weight of the polymeric composition.

In an embodiment, the polymeric composition includes an antioxidant in an amount from 0.01 wt % to 5 wt % based on the weight of the polymeric composition.

3. Additive

The polymeric composition may include one or more of the following optional additives: a filler, a flame retardant, a heat stabilizer, an anti-drip agent, a colorant, a lubricant, a low molecular weight polyethylene, a hindered amine light stabilizer, a UV light absorber, a curing agent, a booster, a retardant, a processing aid, a coupling agent, an antistatic agent, a nucleating agents, a slip agent, a viscosity control agent, a tackifier, an anti-blocking agent, a surfactant, an extender oil, an acid scavenger, a metal deactivator, and any combination thereof.

Applicant has surprisingly discovered that the present plasticizer composed of eSO and TeFAME, unexpectedly provides a plasticizer with color retention when heat aged.

The present polymeric composition may comprise two or more embodiments disclosed herein.

4. Coated Conductor

The present disclosure provides a coated conductor. The coated conductor includes a conductor and a coating on the conductor, the coating formed from the polymeric composition described above.

A "conductor," as used herein, is one or more wire(s) or fiber(s) for conducting heat, light, and/or electricity. The conductor may be a single-wire/fiber or a multi-wire/fiber and may be in strand form or in tubular form. Nonlimiting examples of suitable conductor include metals such as silver, gold, copper, carbon, and aluminum. The conductor may also be optical fiber made from either glass or plastic.

The coated conductor may be flexible, semi-rigid, or rigid. The coating (also referred to as a "jacket" or a "sheath" or "insulation") is on the conductor or on another polymeric layer around the conductor.

In an embodiment, the coating of the coated conductor has a Yellowness Index less than 165, or from 130 to less than 165 when the coated conductor is heat aged at 190° C. for 100 minutes.

The present coated conductor may comprise two or more embodiments disclosed herein.

Definitions

The terms "comprising", "including", "having" and their derivatives do not exclude the presence of any additional component or procedure. The term, "consisting essentially of" excludes any other component or procedure, except those essential to operability. The term "consisting of" excludes any component or procedure not specifically stated.

In an embodiment, the compositions disclosed herein are phthalate-free. The term "phthalate-free composition," as used herein, is a composition devoid of phthalate or is otherwise free of phthalate. A "phthalate," is a compound which includes the following structure (I):

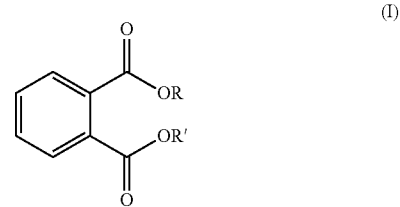

wherein R and R' may be the same or different.

TEST METHODS

APHA (American Public Health Association) color measurement is determined in accordance with ASTM E 1209 as set forth below. ASTM standards E1209 and E313 are followed to standardize results.

Plasticizer samples are prepared and measured using the protocol provided below:

Instrument (BYK Gardner—LCM III) is set (via touch screen panel) to measure Hazen/Alpha indices Each sample to be measured is carefully syringed (10 ml) into individual calibrated cuvette.

Each loaded cuvette is carefully placed into the LCS III and the test button was pushed, after a few seconds a Hazen/Alpha number is generated. This number is recorded, the sample is then removed and placed back into the LCS III and measured a second time (data was recorded) and sample is measured a third time (data recorded).

The loaded cuvette is removed and set aside, the LCS III is then reset to measure Yellowness Index, the same cuvette is then measured for Yellowness Index (three measurements are recorded).

Each cuvette is emptied and disposed.

A new clean cuvette is used for each sample measured.

All recorded data is then recorded into the corresponding Sample Trackers Note that the instrument measurement capability is capped at 1000 APHA value.

Oxirane value (oxirane oxygen) is determined in accordance with ASTM D 165 and using the procedure provided below.

Titrando 888 Metrohm titrator with 801 stir unit and Tiamo 2.1 software is used for epoxy oxygen number analysis.

Sample size—0.15 g
Electrode—pH electrode
Dispensing unit—0.1N Perchloric acid
Reagents:
Dichloromethane
20% tetraethyl ammonium bromide in acetic acid
Procedure:
0.15 g of sample weighed into a 100 ml beaker. Then 30 ml of dichloromethane and 15 ml of 20% tetraethyl ammonium bromide in acetic acid are added. Mix is titrated immediately. Oxirane value is calculated automatically by software.

Yellowness Index (YI) is measured in accordance with ASTM D 1925 (with cross reference to ASTM E 313). A MiniScan XE Colorimeter is used to measure YI with following conditions:

Standard: Working
Display: Absolute
Average: Off
Illuminant/Observe: D65°/10° (Standard observer)
Color Scale: XYZ
Index: YI The colorimeter is calibrated using a white and black color standard tile. The colorimeter is held on the bench top stand and attached to the sample cup holder assembly. The stand is rotated so that the measurement port is facing up. The instrument settings are loaded in the analyzer according to the manufacturer's Instructions. A 2.5 inch clean and dry glass sample cup is fitted with a 10 mm insert black ring so that it settles flat on the bottom of the cup. The ring fixes the internal path length of light through the aqueous sample at 10 mm and excludes ambient light that can cause measurement interference. The sample is gently stirred to ensure a homogeneous mixture. The glass sample cup is then filled with the plasticizer sample until the sample is above the level of the black ring. The white ceramic tile is pushed on the disk down through the liquid sample until it rests firmly on top of the black ring. The disk provides a white background to direct light that travels through the sample back to the detector. The filled sample cup is placed on the measurement port in the sample cup holder to center the cup over the port. The sample cup is covered with the opaque cover. The opaque cover prevents ambient light from outside the instrument from leaking into the detector.

Some embodiments of the present disclosure will now be described in detail in the following Examples.

EXAMPLES

1. Sample Preparation

Oven heat aging: Each plasticizer sample and polymeric composition sample is heated in a type II convection oven at 190° C. Samples are collected at various time intervals and are rested on a table top to cool. After 24 hours, APHA values and YI values are measured on each of these samples.

2. Polymeric Compositions

Table 1 below shows polymeric compositions containing PVC and plasticizer.

TABLE 1

| Polymeric Compositions | | | | |
|---|---|---|---|---|
| Name | Comparative Ex 1 ESO1 + Directly epoxidized eFAME | Comparative Ex 2 ESO2 + Directly epoxidized eFAME | Inventive Ex 1 ESO2 + TeFAME 1 | Inventive Ex. 2 ESO2 + TeFAME 2 |
| Oxyvinyl 240 F (PVC) | 74.85 | 74.85 | 74.85 | 74.85 |
| ESO1 + Directly Epoxidized EFAME (50/50 blend) | 25 | 0 | 0 | 0 |
| ESO2 + Directly Epoxidized EFAME (50/50 blend) | 0 | 25 | 0 | 0 |
| TeFAME 1 | 0 | 0 | 12.5 | 0 |
| ESO 2 | 0 | 0 | 12.5 | 12.5 |
| TeFAME 2 | 0 | 0 | 0 | 12.5 |
| Baeropan 9754 KA | 0.15 | 0.15 | 0.15 | 0.15 |
| Total | 100 | 100 | 100 | 100 |

Table 2 shows Yellowness Index Values for polymeric compositions heat aged at 190° C. for the designated time duration.

TABLE 2

| YI Values | | | |
|---|---|---|---|
| Name | Time, min | YI, Avg | Std dev |
| Comparative Ex 1 | 0 | 8 | 0 |
| Comparative Ex 1 | 5 | 22 | 3 |

TABLE 2-continued

YI Values

| Name | Time, min | YI, Avg | Std dev |
|---|---|---|---|
| Comparative Ex 1 | 10 | 37 | 1 |
| Comparative Ex 1 | 20 | 133 | 0 |
| Comparative Ex 1 | 30 | 152 | 0 |
| Comparative Ex 1 | 40 | 187 | 0 |
| Comparative Ex 2 | 0 | 8 | 0 |
| Comparative Ex 2 | 5 | 23 | 1 |
| Comparative Ex 2 | 10 | 39 | 1 |
| Comparative Ex 2 | 20 | 128 | 2 |
| Comparative Ex 2 | 30 | 142 | 1 |
| Comparative Ex 2 | 40 | 172 | 1 |
| Inventive Ex 1 | 0 | 7 | 0 |
| Inventive Ex 1 | 5 | 11 | 0 |
| Inventive Ex 1 | 10 | 23 | 0 |
| Inventive Ex 1 | 20 | 89 | 0 |
| Inventive Ex 1 | 30 | 90 | 1 |
| Inventive Ex 1 | 40 | 163 | 0 |
| Inventive Ex 2 | 0 | 6 | 0 |
| Inventive Ex 2 | 5 | 12 | 0 |
| Inventive Ex 2 | 10 | 24 | 0 |
| Inventive Ex 2 | 20 | 94 | 1 |
| Inventive Ex 2 | 30 | 124 | 0 |
| Inventive Ex 2 | 40 | 138 | 2 |

Inventive examples 1 and 2 (IE1-2) contain PVC and eSO/TeFAME plasticizer. Comparative Examples 1 and 2 contain PVC, eSO and eFAME. The eFAME of Comparative Examples 1 and 2 is prepared by way of direct epoxidation. IE1 and IE2 unexpectedly have lower YI at 190° C./100 min than Comparative Examples 1 and 2. Bounded by no particular theory, it is believed the lower YI at 190° C./100 min for IE1 and IE2 is due to the stability of the TeFAME as compared to the less stable, direct epoxidized eFAME present in the comparative samples. It is believed the oxirane value of greater than 6.8% contributes to the unexpected stability of the present TeFAME, and resultant color retention of IE1 and IE2 when heat aged.

The invention claimed is:

1. A plasticizer comprising:
a blend of from 35 wt % to 65 wt % an epoxidized soybean oil and from 65 wt % to 35 wt % of a trans-esterified epoxidized fatty acid methyl ester having an oxirane value greater than or equal to 6.8%, based on the total weight of the plasticizer;
the plasticizer having an APHA value from 20 to 60 prior to heat aging;
the plasticizer having an APHA value from 250 to 650 when heat aged at 190° C. for 100 minutes.

2. A polymeric composition comprising:
a vinyl chloride resin; and
the plasticizer of claim 1.

3. The polymeric composition of claim 2 wherein the polymeric composition has a Yellowness Index less than 165 when heat aged at 190° C. for 100 minutes.

4. The polymeric composition of claim 2 wherein the vinyl chloride resin is polyvinyl chloride.

5. A coated conductor comprising:
a conductor;
a coating on the conductor, the coating formed from the polymeric composition of claim 2.

6. The plasticizer of claim 1 wherein the blend consists of the epoxidized soybean oil and the trans-esterified epoxidized fatty acid methyl ester.

7. A polymeric composition comprising:
a vinyl chloride resin;
a plasticizer comprising a blend from 35 wt % to 65 wt % of an epoxidized soybean oil and from 65 wt % to 35 wt % of a trans-esterified epoxidized soybean oil having an oxirane value greater than or equal to 6.8% based on total weight of the plasticizer;
the plasticizer having an APHA value from 20 to 60 prior to heat aging;
the plasticizer having an APHA value from 250 to 650 when heat aged at 190° C. for 100 minutes; and
the polymeric composition has a Yellowness Index less than 165 when heat aged at 190° C. for 100 minutes.

8. The polymeric composition of claim 7 wherein the plasticizer consists of the epoxidized soybean oil and the trans-esterified epoxidized soybean oil.

9. The polymeric composition of claim 8 comprising from 65 wt % to 85 wt % of the vinyl chloride resin; and from 35 wt % to 15 wt % of the plasticizer.

10. The polymeric composition of claim 9 wherein the plasticizer consists of 50 wt % epoxidized soybean oil and 50 wt % of the trans-esterified epoxidized soybean oil based on the total weight of the plasticizer.

11. The plasticizer of claim 1, wherein esters of the trans-esterified epoxidized fatty acid methyl ester consist of methyl esters.

12. The plasticizer of claim 1, wherein the trans-esterified epoxidized fatty acid methyl ester is an aliphatic compound.

* * * * *